(12) United States Patent
Park (10) Patent No.: US 8,942,146 B2
(45) Date of Patent: Jan. 27, 2015

(54) SIGNAL TRANSMISSION METHOD AND APPARATUS IN WIRELESS COMMUNICATION SYSTEM

(75) Inventor: Jae-Hong Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 239 days.

(21) Appl. No.: 12/928,992

(22) Filed: Dec. 23, 2010

(65) Prior Publication Data

US 2011/0158139 A1    Jun. 30, 2011

(30) Foreign Application Priority Data

Dec. 28, 2009    (KR) .................. 10-2009-0131527

(51) Int. Cl.
| | |
|---|---|
| H04B 7/00 | (2006.01) |
| H04L 12/855 | (2013.01) |
| H04J 1/16 | (2006.01) |
| H04J 3/14 | (2006.01) |
| H04L 1/00 | (2006.01) |
| H04L 12/26 | (2006.01) |
| G06F 13/00 | (2006.01) |
| G06F 13/28 | (2006.01) |
| H04L 12/801 | (2013.01) |

(52) U.S. Cl.
CPC ............ *H04L 47/2466* (2013.01); *H04L 47/14* (2013.01); *H04L 47/193* (2013.01)
USPC ............................ 370/310; 370/235; 711/101

(58) Field of Classification Search
USPC ............ 370/241, 235, 310; 718/103; 711/101
See application file for complete search history.

(56) References Cited

U.S. PATENT DOCUMENTS

| | | | | |
|---|---|---|---|---|
| 2002/0116568 | A1* | 8/2002 | Oksanen | 711/101 |
| 2005/0068894 | A1* | 3/2005 | Yu et al. | 370/235 |
| 2007/0280685 | A1* | 12/2007 | Rodrigo et al. | 398/45 |
| 2010/0182911 | A1* | 7/2010 | Pullen et al. | 370/241 |
| 2011/0252428 | A1* | 10/2011 | Maruyama | 718/103 |

OTHER PUBLICATIONS

3GPP TS 25.321 V9.3.0; Technical Specification Group Radio Access Network; 3rd Generation Partnership Project; Medium Access Control (MAC) Protocol Specification, Release 9; Jun. 2010, 192 pages.

3GPP) TS 25.322 V7.9.0; Technical Specification Group Radio Access Network; 3rd Generation Partnership Project; Radio Link Control (RLC) Protocol Specification, Release 7; Mar. 2009, 87 pages.

3GPP TS 25.331 V5.24.0; Technical Specification Group Radio Access Network; Radio Resource Control (RRC) Protocol Specification, Release 5, Jun. 2009, 1,026 pages.

* cited by examiner

*Primary Examiner* — Helal A Algahaim
*Assistant Examiner* — Mahmoud Ismail (57) ABSTRACT

A signal transmission method and apparatus in a wireless communication system using Transmission Control Protocol/Internet Protocol (TCP/IP). The signal transmission apparatus divides packet signals to be transmitted into a control signal and data, stores the control signal and the data in a protocol stack queue using a predetermined scheme such that the control signal is transmitted prior to the data, and transmits the control signal and the data in order of storage in the protocol stack queue.

15 Claims, 6 Drawing Sheets

SIGNAL TRANSMISSION METHOD AND APPARATUS IN WIRELESS COMMUNICATION SYSTEM

CROSS-REFERENCE TO RELATED APPLICATION(S) AND CLAIM OF PRIORITY

The present application is related to and claims priority to an application entitled "Signal Transmission Method and Apparatus in Wireless Communication System" filed in the Korean Industrial Property Office on Dec. 28, 2009, and assigned Ser. No. 10-2009-0131527, the contents of which are hereby incorporated by reference.

TECHNICAL FIELD OF THE INVENTION

The present invention relates to a signal transmission method and apparatus in a wireless communication system.

BACKGROUND OF THE INVENTION

In a wireless communication system, Transmission Control Protocol/Internet Protocol (TCP/IP) is used to assure the reliability of data communication. Accordingly, an interactive service that enables a plurality of nodes to exchange a signal with each other is provided in the wireless communication system. A signal may be transmitted/received on a packet-by-packet basis between the plurality of nodes, and the signal transmitted/received on a packet-by-packet basis may include data, a control signal, or the like. For convenience of description, data and a control signal will be hereinafter referred to collectively as a "packet signal".

Upon receiving data, a first node transmits an Acknowledgement (ACK)/Negative acknowledgement (NACK) signal, which is a control signal, in response to the received data. Then, a second node determines whether or not to further transmit data to the first node, based on the ACK/NACK signal received from the first node, and continuously transmits data to the first node according to a result of the determination. With regard to this, the second node controls the flow of data while transmitting data up to the TCP window size before receiving the ACK/NACK signal.

The higher the data transmission speed, the greater the number of ACK/NACK signals to be handled, which may cause a problem in that data transmission is delayed. TCP/IP has been developed based on a wired communication system, and thus many other problems may also occur in a wireless communication system using TCP/IP.

For example, since a data loss rate is high in a wireless communication system, values expected for several parameters necessary for data transmission are much larger than those in a wired communication system. As a result, there is a problem in that communication cannot be smoothly performed due to delayed data transmission or delayed ACK signal transmission, and the overall throughput is also decreased.

At present, a message format and the like according to the TCP/IP standard are used in a wireless communication system that uses one service through a PPP connection or Ethernet connection, but various parameter values sensitive to time are now in use without any modification. Further, since all packet signals generated for one service have the same priority, it is impossible to packet signals according to priority.

As an example, although a control signal may be transmitted prior to data, the control signal has the same priority as data, and thus cannot be transmitted prior to data. Accordingly, the upper level layer (that is, application layer) of the first node delivers data to the lower level layer (that is, L1/L2/L3 (TCP/IP) layer of a protocol stack) in order of generation, and the lower level layer transmits the delivered data in order of delivery from the upper level layer.

In this way, it is impossible for the lower level layer to determine if a packet signal to be transmitted should be preferentially transmitted unless there is an indicator indicating whether or not the packet signal has high priority. Further, when many packet signals queued in the lower level layer wait for transmission, the packet signals are sequentially transmitted in order of generation, which may cause an undesirable delay.

In a high-speed system using the format according to a low-speed system air interface, throughput and delay time linearly increase by the increment of a data rate in the protocol stack. Further, when an ACK/NACK signal in the protocol stack is transmitted with a delay, there occurs a problem in that transmission of new data is interrupted due to the Tx window full effect. The Tx window full effect refers to the effect in which, although there is a margin in the bandwidth of the second node, the second node cannot transmit data any longer because an ACK/NACK signal in response to transmitted data is not transmitted from the first node. When this Tx window full effect occurs, there is a problem in that throughput for data transmission is lowered.

SUMMARY OF THE INVENTION

To address the above-discussed deficiencies of the prior art, it is a primary object to provide a signal transmission method and apparatus in a wireless communication system.

Further, the present invention provides a signal transmission method and apparatus in a wireless communication system, which can reduce a delay according to data transmission and increase throughput by transmitting a control signal prior to data.

Further, the present invention provides a signal transmission method and apparatus in a wireless communication system, which can separately transmit a control signal and data.

In accordance with an aspect of the present invention, there is provided a signal transmission method by a signal transmission apparatus in a wireless communication system using Transmission Control Protocol/Internet Protocol (TCP/IP). The signal transmission method includes dividing packet signals to be transmitted into a control signal and data. The method also includes storing the control signal and the data in a protocol stack queue using a predetermined scheme such that the control signal is transmitted prior to the data. The method further includes transmitting the control signal and the data in order of storage in the protocol stack queue.

In accordance with another aspect of the present invention, there is provided a signal transmission apparatus in a wireless communication system using Transmission Control Protocol/Internet Protocol (TCP/IP). The signal transmission apparatus includes a transceiver coupled to at least one antenna configured to perform wireless communication and a packet signal generator configured to generate packet signals to be transmitted through the transceiver. The apparatus also includes a protocol stack queue configured to store the generated packet signals. The apparatus further includes a controller configured to divide the generated packet signals into a control signal and data, store the control signal and the data in the protocol stack queue using a predetermined scheme such that the control signal is transmitted prior to the data, and transmit the control signal and the data in order of storage in the protocol stack queue.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the gist of the present invention.

The present disclosure describes a signal transmission method and apparatus that can change the transmission order of a packet signal to be transmitted without affecting a service being provided in a wireless communication system. More specially, the present disclosure describes a signal transmission method and apparatus that can distinguish between a control signal and data, and transmit the control signal prior to the data.

In the following description, a wireless communication system will be proposed as a wireless communication system using TCP/IP (Transmission Control Protocol/Internet Protocol), by way of example. In a signal transmission apparatus of such a wireless communication system, data generated in the application layer of a protocol stack should be transmitted in order of generation.

A control signal may be generated not in the application layer, but in the TCP/IP layer (in particular, TCP layer). Accordingly, even though the transmission order of a control signal is changed, a service being provided in the wireless communication system is not hindered at all. In actuality, a control signal neither assures the reliability of transmission nor is retransmitted.

Hereinafter, a packet queuing scheme in a conventional protocol stack will be described with reference to FIG. 1.

Figure 1:
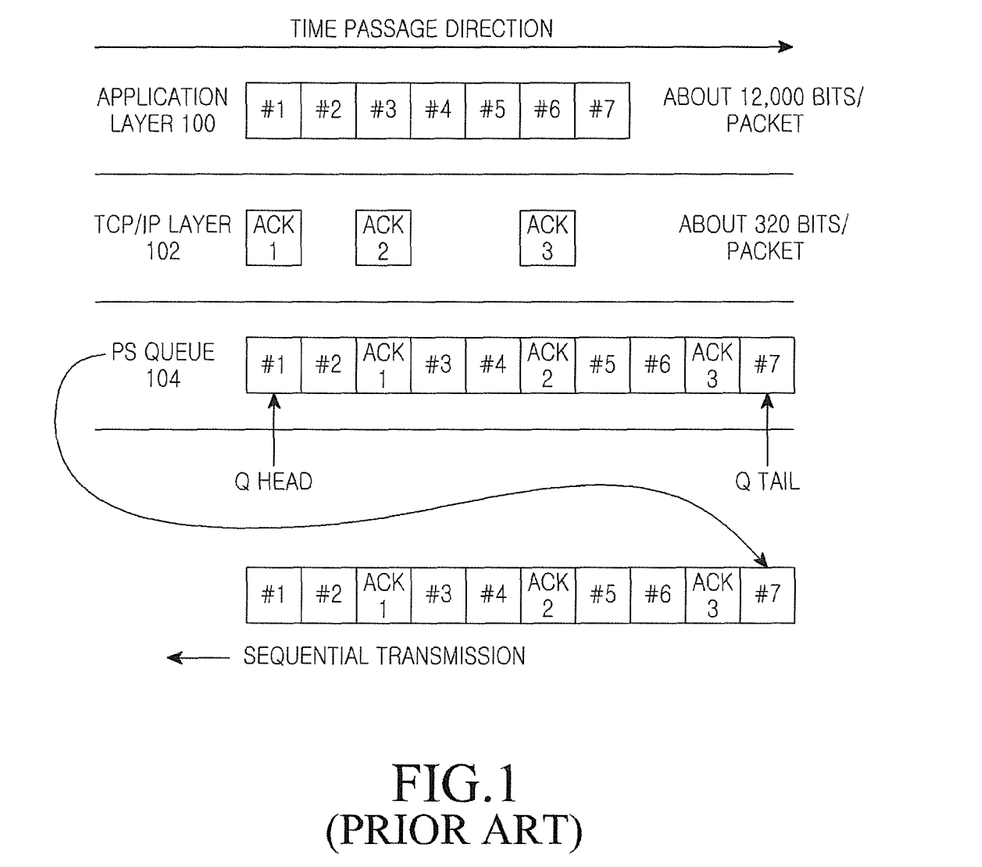
FIG. 1 illustrates a packet queuing scheme in a protocol stack of a conventional signal transmission apparatus.

FIG. 1 illustrates a packet queuing scheme in a protocol stack of a conventional signal transmission apparatus.

Referring to FIG. 1, the protocol stack is divided into the application layer 100 and the TCP/IP layer 102. In the application layer 100, data is generated based on a protocol directly associated with a user application, such as HTTP (Hyper Text Transfer Protocol), POP (Post Office Protocol), and SMTP (Simple Mail Transfer Protocol). Here, the data may be configured with a size of about 12,000 bits per packet.

In the TCP/IP layer 102, a control signal is generated. The control signal may be configured with a size of about 320 bits per packet. By way of example, the following description will be given on the assumption that the control signal is an ACK/NACK signal.

If data and ACK/NACK signals are generated in the application layer 100 and the TCP/IP layer 102 respectively, then the data and control signals are stored in a protocol stack queue (PS queue) 104 in order of generation.

FIG. 1 shows that the data and control signals are generated in order of "#1, #2, ACK 1, #3, #4, ACK 2, #5, #6, ACK 3, and #7", and are stored in the PS queue 104 in that order, that is, in order of "#1, #2, ACK 1, #3, #4, ACK 2, #5, #6, ACK 3, and #7". The data and control signals stored in the PS queue 104 are sequentially transmitted in the first in first out (FIFO) scheme.

As shown in FIG. 1, the conventional signal transmission apparatus transmits data and ACK/NACK signals in order of generation without distinguishing between them. As a result, the conventional transmission apparatus has a problem in that data transmission is delayed due to the Tx window full effect. This will be described in more detail with reference to FIG. 2.

Figure 2:
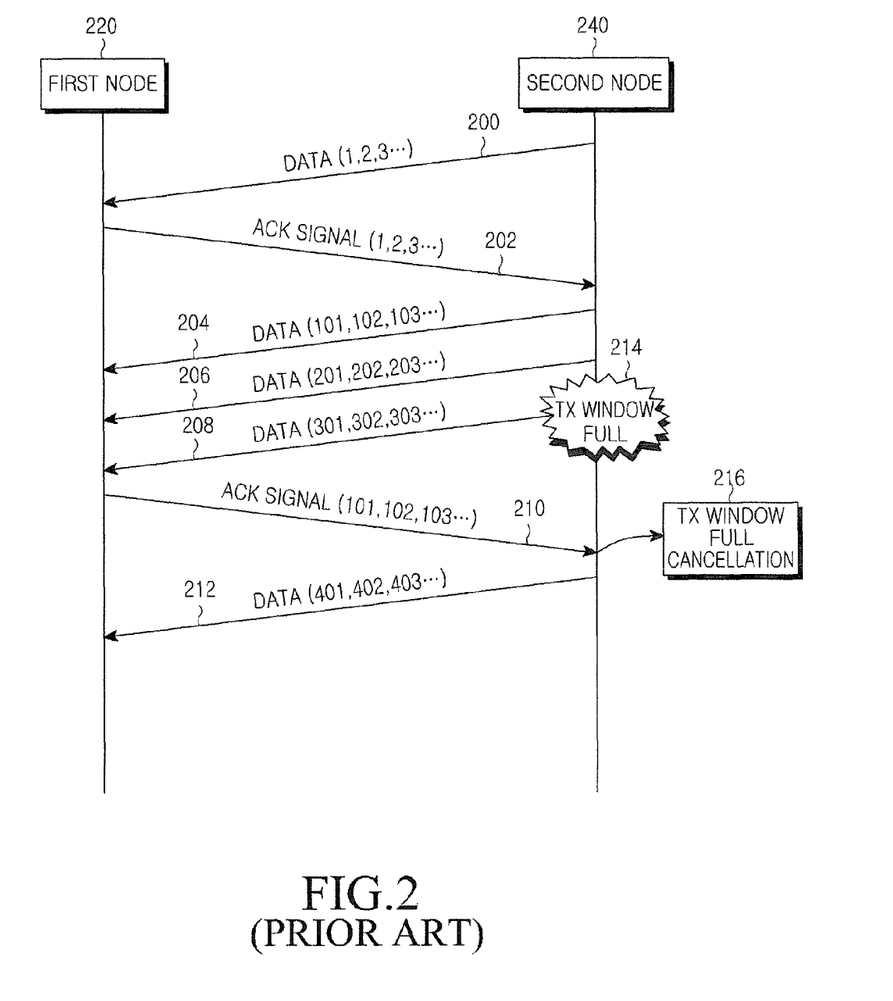
FIG. 2 illustrates a process in which data transmission is delayed due to the Tx window full effect in a conventional wireless communication system.

FIG. 2 illustrates a process in which data transmission is delayed due to the Tx window full effect in a conventional wireless communication system.

Referring to FIG. 2, in block 200, a second node 240 transmits data 1, 2, 3 to a first node 220. Then, the first node 220 transmits an ACK signal 1, 2, 3, which is a response signal informing the second node 240 of the reception of the data 1, 2, 3, to the second node 240.

Upon receiving the ACK signal 1, 2, 3, the second node 240 transmits data corresponding to its transmission window size, that is, data 101, 102, 103, data 201, 202, 203, and data 301, 302, 303, in blocks 204 to 208.

After the data 301, 302, 303 is transmitted in block 208, the second node 240 cannot transmit data any longer due to the Tx window full effect. That is, it is impossible for the second node 240 to additionally transmit data before receiving an ACK signal 101, 102, 103 from the first node 220.

As an example, when the maximum number of packet signals that the second node 240 can transmit without receiving an ACK or NACK signal is 3, the Tx window full effect occurs and thus data cannot be transmitted any longer in block 214 corresponding to a point of time after transmission of three consecutive data.

The Tx window full effect is cancelled when the ACK signal 101, 102, 103 is received from the first node 220 in block 216. Consequently, there is a problem in that the second node's transmission of data 401, 402, 403 in block 212 is delayed.

Therefore, as a solution to this problem, an embodiment of the present invention proposes a way to prevent data from being delayed by allowing the first node to transmit a control signal prior to a transmission signal.

Figure 3:
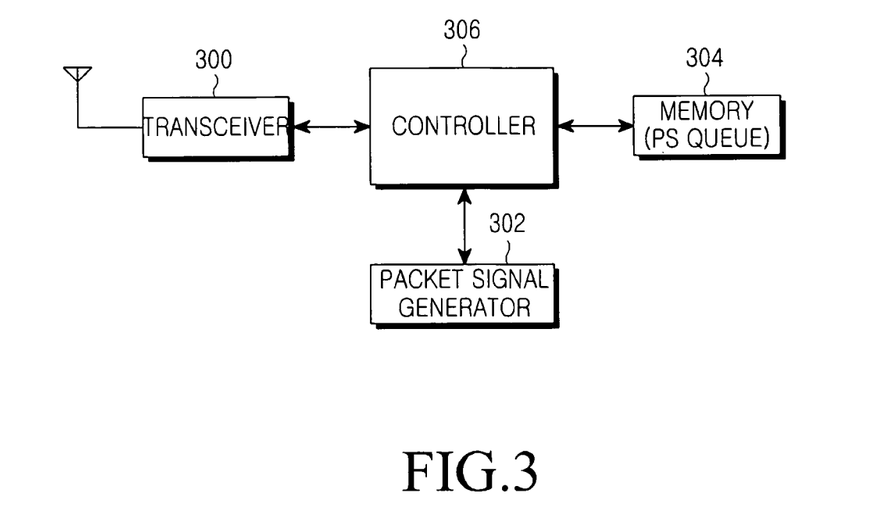
FIG. 3 illustrates an internal structure of a signal transmission apparatus in a wireless communication system in accordance with an embodiment of the present invention.

FIG. 3 illustrates an internal structure of a signal transmission apparatus in a wireless communication system according to an embodiment of the present invention. The signal transmission apparatus presented in FIG. 3 may be the first node that is in communication with the second node in FIG. 2. Accordingly, the signal transmission apparatus in FIG. 3 will be hereinafter referred to as the first node.

Referring to FIG. 3, the first node includes a transceiver 300, a packet signal generator 302, a memory 304, and a controller 306.

The transceiver 300 takes charge of the wireless communication function of the first node. As an example, the transceiver 300 transmits/receives a packet signal to/from the second node.

The packet signal generator 302 generates a packet signal. More specifically, the packet signal generator 302 generates data in the application layer of a protocol stack, and generates a control signal in the TCP/IP layer of the protocol stack.

The memory 304 stores data received through the transceiver 300, or stores data or a control signal generated by the packet signal generator 302. By way of example, the memory 304 may be a PS queue, and thus the memory 304 will be hereinafter referred to as the PS queue.

The controller 306 controls the transceiver 300, the packet signal generator 302, and the memory 304, and manages and controls the overall operation of the first node. Hereinafter, an operation of the controller 306 will be described in detail with reference to FIG. 4.

Figure 4:
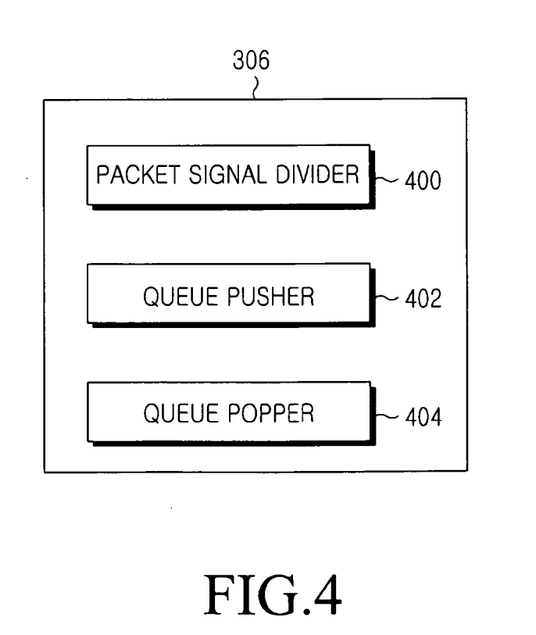
FIG. 4 illustrates an internal structure of a controller in accordance with an embodiment of the present invention.

FIG. 4 illustrates an internal structure of the controller according to an embodiment of the present invention.

Referring to FIG. 4, the controller 306 of FIG. 3 includes a packet signal divider 400, a queue pusher (queuer) 402, and a queue popper (dequeuer) 404.

The packet signal divider 400 divides a packet signal, generated by the packet signal generator 302, into a control signal and data. In one embodiment, the packet signal divider 400 distinguishes between the control signal and the data, based on the fact that the payload size of the control signal is "0".

The queue pusher 402 stores the control signal and the data, divided by the packet signal divider 400, in the PS queue 304. In storing the control signal and the data, the queue pusher 402 gives the control signal higher priority than the data, and then stores the control signal and the data in the PS queue in different schemes.

More specifically, when the queue pusher 402 stores data, it stores the data in the tail of the PS queue 304. When storing multiple data, the queue pusher 402 stores the multiple data in the tail of the PS queue 304 in order of generation such that data generated earliest of all can be transmitted in the first place according to the FIFO scheme.

In addition, when the queue pusher 402 stores a control signal, it stores the control signal in the head of the PS queue 304. When storing multiple control signals, the queue pusher 402 stores the multiple control signals in the head of the PS queue 304 such that the last pushed control signal can be transmitted in the first place according to the last in first out (LIFO) scheme.

When there is a control signal previously stored in the PS queue 304, the queue pusher 402 may also delete the previously stored control signal and then store a corresponding control signal. This is because, when the control signals are ACK/NACK signals, the second node can recognize through transmission of the latest generated ACK/NACK signal that data transmitted earlier than data corresponding to the latest generated ACK/NACK signal have been all successfully received.

When packet signals are transmitted, the queue popper 404 brings packet signals in an amount corresponding to a predetermined data rate from the PS queue 304. With regard to this, when there are multiple control signals in the PS queue 304, the queue popper 404 selects the latest generated control signal. The latest generated control signal refers to the control signal delivered from the application layer to the TCP/IP layer at a time point closest to the current time point.

Since the multiple control signals are pushed into in the head of the PS queue 304, the latest generated control signal is stored at a location closest to the head of the PS queue 304, and thus can be transmitted in the first place. Further, since data are stored at a location next to the multiple control signals in the PS queue 304, they are transmitted after the multiple control signals are all transmitted.

In this way, therefore, data stored in the PS queue can be transmitted in order of storage according to the FIFO scheme, and control signals stored in the PS queue can be transmitted in such a scheme that the latest generated control signal (that is, the last stored control signal) is transmitted prior to the data according to the LIFP scheme.

The operation of the controller 306 may be divided into those of the packet signal divider 400, the queue pusher 402, and the queue popper 404. However, in the following, the operations of the packet signal divider 400, the queue pusher 402, and the queue popper 404 will not be separately described, but will be collectively described as the operation of the controller 306.

Figure 5:
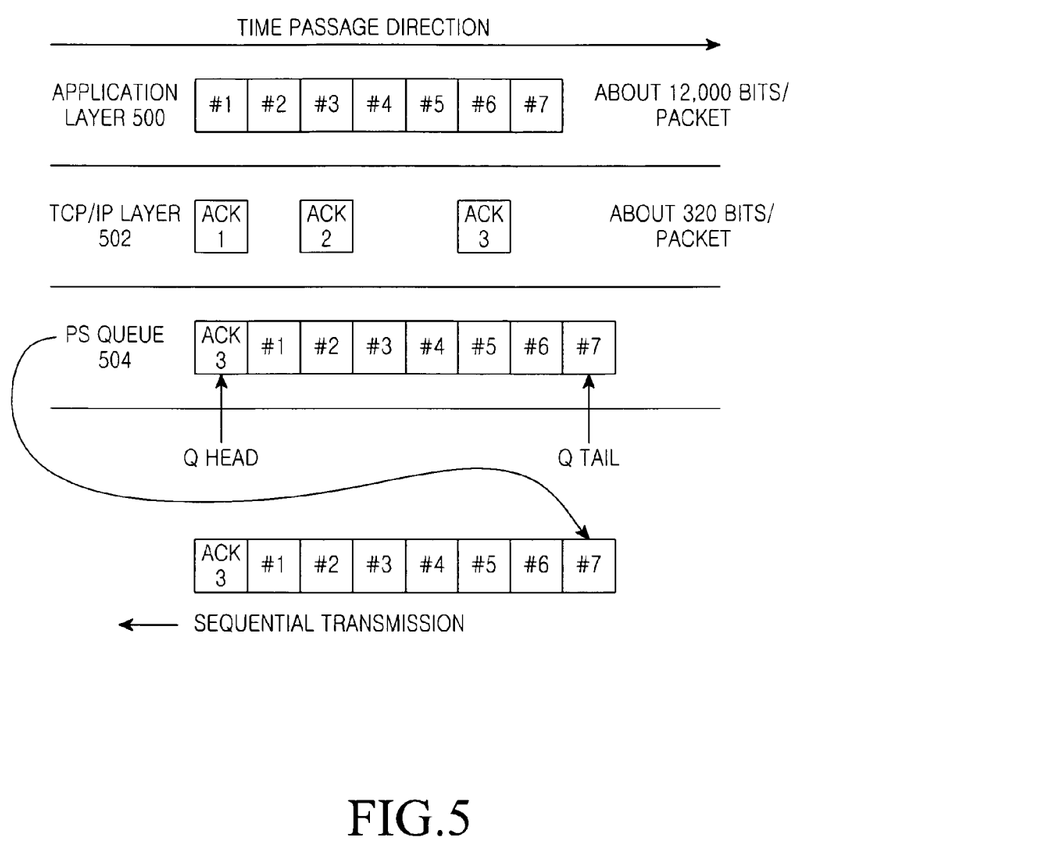
FIG. 5 illustrates a packet queuing scheme in a protocol stack of a signal transmission apparatus in accordance with an embodiment of the present invention.

FIG. 5 illustrates a packet queuing scheme in a protocol stack of a signal transmission apparatus according to an embodiment of the present invention. For the better understanding of the packet queuing scheme according to this embodiment of the present invention, a description thereof will be given with reference to the constituent elements of FIG. 3.

Referring to FIG. 5, in the application layer 500 of the protocol stack, data is generated based on a protocol directly associated with a user application, such as HTTP, POP, and SMTP. In the TCP/IP layer 502, a control signal is generated. Here, a control signal refers to a signal used for synchronization, session initialization, error control, and the like.

For convenience of description and by way of example, the following description will be given on the assumption that the control signal is an ACK/NACK signal.

If data and an ACK signal are generated in the application layer 500 and the TCP/IP layer 502 respectively, then the controller 306 separates the ACK signal from the data by using the fact that the payload size of the ACK signal is "0". The controller 306 also stores the ACK signal and the data in the PS queue 304 in the following scheme.

When the controller 306 stores the ACK signal, it determines if there is an ACK or NACK signal previously stored in the PS queue 304. When there is no ACK or NACK signal previously stored in the PS queue 304, the controller 306 stores the corresponding ACK signal in the head of the PS queue 304.

When there is an ACK or NACK signal previously stored in the PS queue 304, the controller deletes the previously stored ACK or NACK signal from the PS queue 304, and stores the corresponding ACK signal in the head of the PS queue 304 according to the LIFO scheme. This is because, when the latest generated ACK signal is transmitted, the second node can recognize that data transmitted earlier than data corresponding to the latest generated ACK signal have been all successfully received.

When the controller 306 stores the data, it stores the data in the tail of the PS queue 304 according to the FIFO scheme.

An example of the PS queue 304 in which the ACK signal and the data are stored in this way is as follows. When data "#1, #2, #3, #4, #5, #6, and #7" are generated in the application layer 500, and ACK signals "ACK 1, ACK 2, and ACK 3" are generated in the TCP/IP layer 502, the generated data and ACK signals are stored in the PS queue 304 in order of "ACK 3, #1, #2, #3, #4, #5, #6, and #7". Here, since ACK 1 and ACK 2 are generated earlier than ACK 3, they are all deleted.

More specially, when ACK 1 is generated, it can be immediately stored in the head of the PS queue 304 because there are no ACK or NACK signals in the PS queue 304.

When ACK 2 is generated, ACK 1 is deleted from the PS queue 304 and ACK 2 is stored in the PS queue 304 because ACK 1 generated earlier than ACK 2 is stored in the PS queue 304.

In the same scheme, when ACK 3 is generated, ACK 2 is deleted from the PS queue 304 and ACK 3 is stored in the PS queue 304 because ACK 2 generated earlier than ACK 3 is stored in the PS queue 304. In this way, the latest generated ACK or NACK signal exists in the PS queue 304.

In another embodiment of the present invention, the above process of deleting the previously stored ACK or NACK signal may not be performed. In this embodiment, ACK 1 to ACK 3 are stored in the PS queue 304 in order of "ACK3, ACK 2, ACK 1" from the head of the PS queue 304.

The data stored in the PS queue 304 are sequentially transmitted in order of storage in the PS queue 304 according to the FIFO scheme, and the ACK signal is transmitted prior to the data. Further, when multiple ACK signals are stored in the PS queue 304, the last stored ACK signal, that is, ACK 3, is transmitted in the first place according to the LIFO scheme.

Accordingly, in the embodiment of the present invention, a control signal can be transmitted prior to data, and thus the problem of a delay in data transmission due to the Tx window full effect can be advantageously solved.

Hereinafter, a signal transmission procedure between nodes will be described with reference to FIG. 6.

Figure 6:
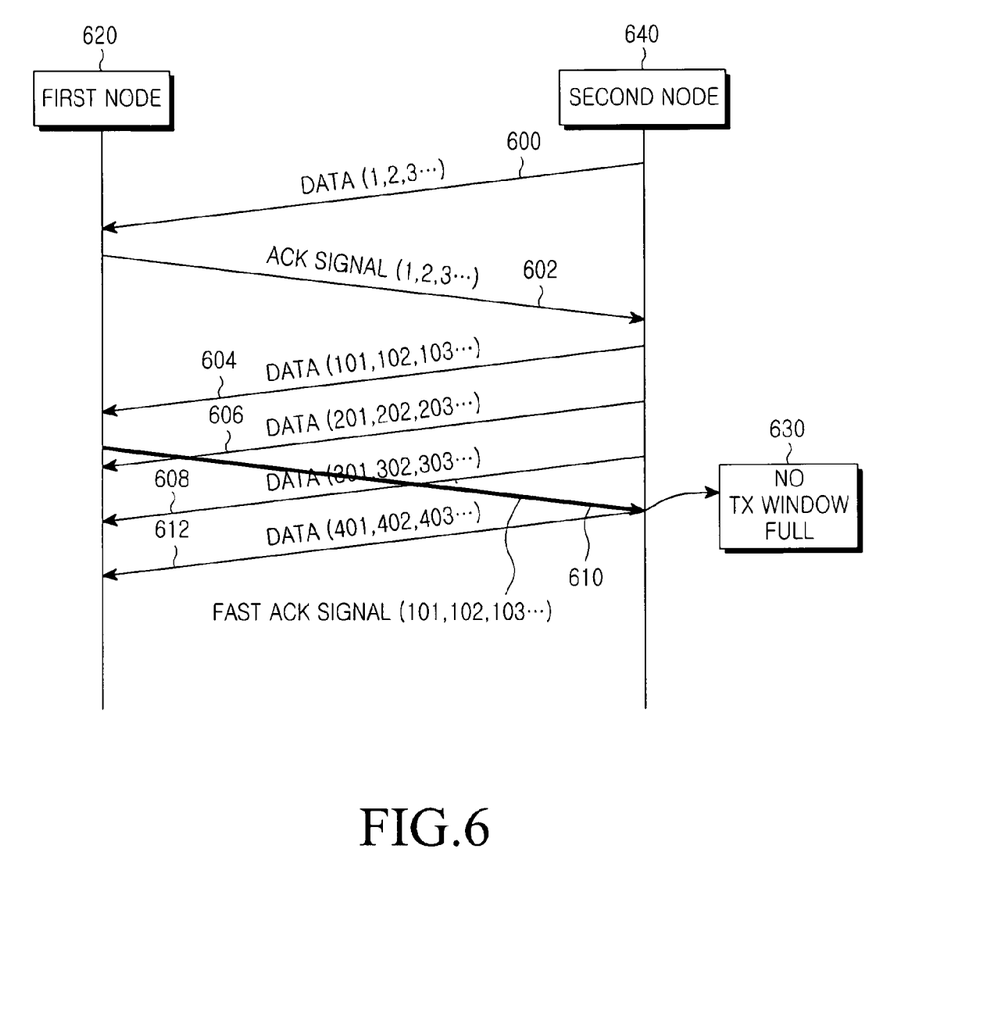
FIG. 6 illustrates a signal transmission procedure of a signal transmission apparatus in a wireless communication system in accordance with an embodiment of the present invention.

FIG. 6 illustrates a signal transmission procedure of a signal transmission apparatus in a wireless communication system according to an embodiment of the present invention.

Referring to FIG. 6, in block 600, the second node 640 transmits data 1, 2, 3 to the first node 620. In block 602, the first node 620 then transmits ACK signal 1, 2, 3, which is a response signal informing the second node 640 of the reception of the data 1, 2, 3, to the second node 640.

Upon receiving the ACK signal 1, 2, 3, the second node 640 transmits data corresponding to its transmission window size, that is, data 101, 102, 103, data 201, 202, 203, and data 301, 302, 303, in blocks 604 to 608.

Further, the second node 640 receives ACK signal 101, 102, 103 from the first node 620 in block 610, and thus can transmit data 401, 402, 403 in block 612 immediately after data 301, 302, 303 is transmitted.

That is, since an ACK signal is transmitted prior to data in the first node 620, the second node 640 can more quickly receive the ACK signal corresponding to the relevant data from the first node 620. Accordingly, the Tx window full effect does not occur in the second node 640 in block 630, and thus data transmission/reception is not also delayed between the first node 620 and the second node 640.

Next, a signal transmission method in the first node will be discussed with reference to FIG. 7.

Figure 7:
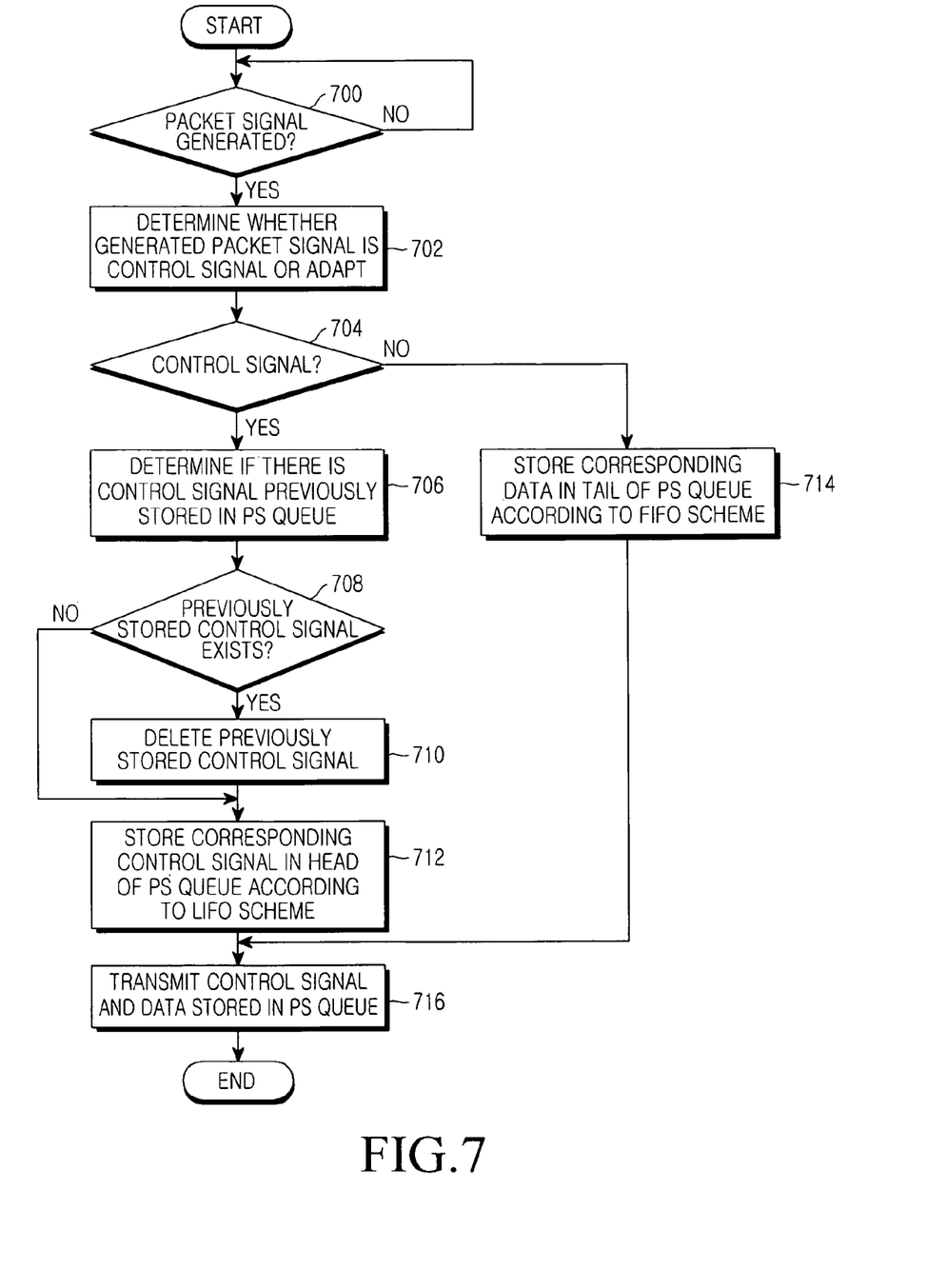
FIG. 7 illustrates a signal transmission method for a signal transmission apparatus in a wireless communication system in accordance with an embodiment of the present invention.

FIG. 7 illustrates a signal transmission method for a signal transmission apparatus in a wireless communication system according to an embodiment of the present invention.

Referring to FIG. 7, in block 700, the controller 306 determines if a packet signal is generated in the packet signal generator 302, and proceeds to block 702 when a packet signal is generated. When a packet signal is generated, the controller 306 determines whether the generated packet signal is a control signal or data, based on the payload size of the corresponding packet signal.

When the generated packet signal is determined in block 704 to be a control signal, the payload of which has a size of "0", the controller 306 proceeds to block 706, and determines if there is a control signal previously stored in the PS queue 304.

When, as a result of the determination, there is a previously stored control signal in block 708, the controller 306 proceeds to block 710, and deletes the previously stored control signal from the PS queue 304. Subsequently, the controller 306 proceeds to block 712, and stores the corresponding control signal in the head of the PS queue 304 according to the LIFO scheme.

Conversely, when there is no previously stored control signal, the controller 306 proceeds directly to block 712.

In another embodiment of the present invention, blocks 708 and 710 may be omitted. That is, the blocks for deleting a control signal previously stored in the PS queue 304 may be omitted. In such an embodiment, the latest generated control signal is stored at a location closest to the head of the PS queue 304.

When the generated packet signal is determined in block 704 to be data, the payload of which does not have a size of "0", the controller 306 proceeds to block 714, and stores the corresponding data in the tail of the PS queue 304 according to the FIFO scheme.

When the data and the control signal are stored in the PS queue 304 in this way, in block 716, the controller 306 transmits the data and the control signal in order of storage in the PS queue 304. Since the control signal is stored at a location closer to the head of the PS queue 304 than the data, it can be transmitted prior to the data.

In this way, the signal transmission apparatus can receive data without any delay, thus more quickly and smoothly performing wireless communication. Further, since transmission of new data is not interrupted or data retransmission is not needed in an apparatus communicating with the signal transmission apparatus, the overall throughput according to data transmission/reception can be increased.

As described above, the present invention includes a feature that the transmission order of a packet signal can be changed according to whether the corresponding packet signal is data or a control signal in a TCP/IP-based wireless communication system. In an embodiment of the present invention, a control signal can be transmitted prior to data, such that packet signal retransmission is not needed or a packet signal is not delayed. When a control signal is transmitted prior to data in this way, interruption of packet signal transmission is prevented from being caused by the Tx window full effect, and a number of packet signals can be transmitted in a short time. Therefore, the present invention can improve throughput according to packet signal transmission in a wireless communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A signal transmission method by a signal transmission apparatus in a wireless communication system using transmission control protocol/internet protocol (TCP/IP), the signal transmission method comprising:
    dividing packet signals to be transmitted into a plurality of control signals and multiple data based on a payload size of each of the packet signals;
    storing a first control signal as a latest generated control signal among the plurality of control signals in a protocol stack queue by inputting the first control signal to a head of the protocol stack queue;
    storing the multiple data in the protocol stack queue by inputting the multiple data to a tail of the protocol stack queue according to an order of generation; and
    transmitting the first control signal and the multiple data in order stored in a location closest to the head of the protocol stack queue such that the first control signal is transmitted before the multiple data is transmitted.

2. The signal transmission method as claimed in claim 1, wherein the first control signal is stored in the head of the protocol stack queue according to a last in first out (LIFO) scheme and the multiple data are stored in the tail of the protocol stack queue according to a first in first out (FIFO) scheme.

3. The signal transmission method as claimed in claim 1, wherein storing the first control signal in the head of the protocol stack queue comprises:
    when there is a second control signal previously stored in the head of the protocol stack queue, deleting the second control signal from the protocol stack queue; and
    storing the first control signal in the head of the protocol stack queue.

4. The signal transmission method as claimed in claim 1, wherein the first control signal comprises an acknowledgement (ACK) signal.

5. The signal transmission method as claimed in claim 1, wherein the first control signal comprises a negative acknowledgement (NACK) signal.

6. A signal transmission apparatus in a wireless communication system using transmission control protocol/internet protocol (TCP/IP), the signal transmission apparatus comprising:
    a transceiver coupled to at least one antenna configured to perform wireless communication;
    a packet signal generator configured to generate packet signals to be transmitted through the transceiver;
    a protocol stack queue configured to store the generated packet signals; and
    a controller configured to divide the generated packet signals into a plurality of control signals and multiple data based on a payload size of each of the packet signals, store a first control signal as a latest generated control signal among the plurality of control signals in the protocol stack queue by inputting the first control signal to a head of the protocol stack queue, store the multiple data in the protocol stack queue by inputting the multiple data to a tail of the protocol stack queue according to an order of generation, and control the transceiver to transmit the first control signal and the multiple data in order stored in a location closest to the head of the protocol stack queue such that the first control signal is transmitted before the multiple data is transmitted.

7. The signal transmission apparatus as claimed in claim 6, wherein the controller comprises:
    a packet signal divider configured to divide the generated packet signals into the plurality of control signals and the multiple data;
    a queue pusher configured to store the first control signal in the head of the protocol stack queue and to store the multiple data in the tail of the protocol stack queue according to an order of generation; and
    a queue popper configured to bring the first control signal and the multiple data from the protocol stack queue.

8. The signal transmission apparatus as claimed in claim 6, wherein the first control signal is stored in the head of the protocol stack queue according to a last in first out (LIFO) scheme, and the multiple data are stored in the tail of the protocol stack queue according to a first in first out (FIFO) scheme.

9. The signal transmission apparatus as claimed in claim 6, wherein, when there is a second control signal previously stored in the head of the protocol stack queue, the controller deletes the second control signal from the protocol stack queue, and stores the first control signal in the head of the protocol stack queue.

10. The signal transmission apparatus as claimed in claim 6, wherein the first control signal comprises an acknowledgement (ACK) signal.

11. The signal transmission apparatus as claimed in claim 6, wherein the first control signal comprises a negative acknowledgement (NACK) signal.

12. A wireless communication system configured for transmission control protocol/internet protocol (TCP/IP) communication, the wireless communication system comprising:
    at least two nodes, wherein each of the at least two nodes comprises:
        a transceiver configured to perform wireless communication;
        a packet signal generator configured to generate packet signals to be transmitted through the transceiver;
        a stack queue memory configured to store the generated packet signals; and
        a controller configured to divide the generated packet signals into a plurality of control signals and multiple data based on a payload size of each of the packet signals, store a first control signal as a latest generated control signal among the plurality of control signals in the stack queue memory by inputting the first control signal to a head of the stack queue memory, store the multiple data in the stack queue memory by inputting the multiple data to a tail of the stack queue memory according to an order of generation, and to control the transceiver to transmit the first control signal and the multiple data in order stored in a location closest to the head of the stack queue memory such that the first control signal is transmitted before the multiple data is transmitted.

13. The wireless communication system as claimed in claim 12, wherein the controller of each node comprises:
   a packet signal divider configured to divide the generated packet signals into the plurality of control signals and the multiple data;
   a queue pusher configured to store the first control signal in the head of the protocol stack queue and to store the multiple data in the tail of the protocol stack queue according to an order of generation; and
   a queue popper configured to bring the first control signal and the multiple data from the stack queue memory.

14. The wireless communication system as claimed in claim 12, wherein the first control signal is stored in the head of the stack queue memory according to a last in first out (LIFO) scheme, and the multiple data are stored in the tail of the stack queue memory according to a first in first out (FIFO) scheme.

15. The wireless communication system as claimed in claim 14, wherein, when there is a second control signal previously stored in the head of the stack queue memory, the controller deletes the second control signal from the stack queue memory, and stores the first control signal in the head of the stack queue memory.

* * * * *